(12) United States Patent
Ma et al.

(10) Patent No.: US 12,536,374 B2
(45) Date of Patent: Jan. 27, 2026

(54) METHOD FOR CONSTRUCTING SENTIMENT CLASSIFICATION MODEL BASED ON METAPHOR IDENTIFICATION

(71) Applicant: UNIDT (SHANGHAI) CO., LTD, Shanghai (CN)

(72) Inventors: Ren Ma, Shanghai (CN); Qing Xu, Shanghai (CN); Weilin Shen, Shanghai (CN)

(73) Assignee: UNIDT (SHANGHAI) CO., LTD, Shanghai (CN)

( * ) Notice: Subject to any disclaimer, the term of this patent is extended or adjusted under 35 U.S.C. 154(b) by 676 days.

(21) Appl. No.: 17/900,607

(22) Filed: Aug. 31, 2022

(65) Prior Publication Data

US 2023/0289528 A1 Sep. 14, 2023

(30) Foreign Application Priority Data

Mar. 10, 2022 (CN) .......................... 202210240916.9

(51) Int. Cl.
*G06F 40/289* (2020.01)
(52) U.S. Cl.
CPC ................................ *G06F 40/289* (2020.01)
(58) Field of Classification Search
CPC .................................................... G06F 40/289
See application file for complete search history.

(56) References Cited

U.S. PATENT DOCUMENTS

2013/0124438 A1 5/2013 Lee et al.

FOREIGN PATENT DOCUMENTS

CN 106326212 A 1/2017
CN 109101490 A 12/2018
(Continued)

OTHER PUBLICATIONS

Zhang, Dongyu, et al. "In Your Face: Sentiment Analysis of Metaphor with Facial Expressive Features." 2021 International Joint Conference on Neural Networks (IJCNN). IEEE, 2021. (Year: 2021).*

(Continued)

*Primary Examiner* — Bhavesh M Mehta
*Assistant Examiner* — Edward Tracy, Jr.
(74) *Attorney, Agent, or Firm* — MASCHOFF BRENNAN

(57) ABSTRACT

A method for constructing a sentiment classification model based on metaphor identification is disclosed, including: constructing a metaphor training corpus, and training a first pre-trained language model using the metaphor training corpus to obtain a metaphor recognition model; constructing and inputting a sentiment classification corpus into a second pre-trained language model and the metaphor recognition model to extract an explicit characteristic value and a metaphor information characteristic value of a text in the sentiment classification corpus; combining the explicit characteristic value and the metaphor information characteristic value to obtain a comprehensive characteristic value which is input to a feedforward neural network and a binary classification softmax layer to obtain a sentiment classification result; and performing optimization training based on the sentiment classification result using BP algorithm to obtain an optimal sentiment classification model. Explicit and implicit sentiment expressions are comprehensively considered, and more accurate and credible evaluation results are provided.

10 Claims, 2 Drawing Sheets

(56) References Cited

FOREIGN PATENT DOCUMENTS

| CN | 111078894 A | 4/2020 |
| CN | 112084788 A | 12/2020 |
| CN | 112256859 A | 1/2021 |
| CN | 112329472 A | 2/2021 |

OTHER PUBLICATIONS

Chinese Office Action for Chinese Patent Application No. CN202210240916.9 mailed Mar. 2, 2023.
International Search Report and Written Opinion for International Application No. PCT/CN2022/088437 mailed Dec. 8, 2022.
Liao, Jian. Research on Fact-implied Implicit Sentiment Analysis Based on Representation Learning. Diss. PhD thesis, Shanxi University, Jun. 2018.

* cited by examiner

METHOD FOR CONSTRUCTING SENTIMENT CLASSIFICATION MODEL BASED ON METAPHOR IDENTIFICATION

CROSS-REFERENCE TO RELATED APPLICATIONS

This application claims the priority to Chinese Patent Application No. 202210240916.9, filed on Mar. 10, 2022, and entitled "METHOD FOR CONSTRUCTING SENTIMENT CLASSIFICATION MODEL BASED ON METAPHOR IDENTIFICATION", the entire disclosure of which is incorporated herein by reference.

TECHNICAL FIELD

The present disclosure generally relates to computer application technology field, and more particularly, to a method for constructing a sentiment classification model based on metaphor identification.

BACKGROUND

Text sentiment classification refers to a process of analyzing, processing, summarizing and reasoning on a subjective emotionally-charged text using natural language processing and text mining technology, that is, analyzing whether an attitude of the text is positive or negative. Text sentiment classification can be applied to a massive amount of text data on the Internet, which can better mine behavioral patterns of netizens, help decision-making institutions to understand public sentiment trends, and improve service quality of business.

Traditional text sentiment classification always focuses on obviously emotionally-charged words in texts. However, in daily expression, sentiment reflected by people's experience and actions on objective things are rich and abstract. In addition to subjective expression with emotionally-charged words, rhetorical methods such as metaphors, similes, rhetorical questions and ironies are also used to implicitly express sentiment. Existing text sentiment classification techniques do not attempt to interpret these implicit sentiment expressions, and accordingly incomplete extraction of text sentiment information reduces accuracy and credibility of text sentiment classification.

SUMMARY

Embodiments of the present disclosure provide a method for constructing a sentiment classification model based on metaphor identification, which comprehensively considers explicit and implicit sentiment expressions, analyzes text sentiment information at different levels more thoroughly, and provides more accurate and credible evaluation results.

In an embodiment, a method for constructing a sentiment classification model based on metaphor identification is provided, including: constructing a metaphor training corpus, and training a first pre-trained language model using the metaphor training corpus to obtain a metaphor identification model; constructing a sentiment classification corpus, and inputting the sentiment classification corpus into a second pre-trained language model and the metaphor identification model respectively to extract an explicit characteristic value and a metaphor information characteristic value of a text in the sentiment classification corpus; combining the explicit characteristic value and the metaphor information characteristic value to obtain a comprehensive characteristic value, and inputting the comprehensive characteristic value to a feedforward neural network and a binary classification softmax layer to obtain a sentiment classification result; and performing optimization training based on the sentiment classification result using a BP algorithm to obtain an optimal sentiment classification model.

Optionally, said constructing a metaphor training corpus includes labeling a metaphor tag and constructing a characteristic indicator; wherein labeling a metaphor tag includes labeling each word in the text with a tag of having or not having a metaphor through a standardized metaphor identification procedure; and constructing a characteristic indicator includes: constructing a plurality of sub characteristic indicators including the word itself, a rough graininess tag, a fine graininess tag, a short sentence where the word is located, a full long sentence where the word is located, and splicing the plurality of sub characteristic indicators to obtain the characteristic indicator.

Optionally, said training a first pre-trained language model using the metaphor training corpus to obtain a metaphor identification model includes: applying a K-fold cross validation method based on the metaphor training corpus and the first pre-trained language model to obtain the metaphor identification model, where the metaphor training corpus is divided into K parts, one of the K parts is taken as a test set, the remaining (K−1) parts are taken as the training set, the first pre-trained language model is trained and cross-validated for K times, and the model obtained with a best training effect is used as the metaphor identification model.

Optionally, the training and cross-validation of the first pre-trained language model each time includes: inputting the training set into the first pre-trained language model, the text with the characteristic indicator in the training set being converted into a vector through an embedding layer, and the vector sequentially passing through a transformer coding layer, the feedforward neural network and the binary classification softmax layer to output a metaphor classification result; comparing the labelled metaphor tag with the metaphor classification result, and adopting the BP algorithm to iteratively train the first pre-trained language model based on the training set; during the training, calculating an accuracy by performing a following test on the trained first pre-trained language model with the test set; and when the accuracy is no longer improved, saving parameters of the first pre-trained language model to obtain the trained first pre-trained language model at this time.

Optionally, said constructing a sentiment classification corpus includes labeling a sentiment polarity and constructing a characteristic indicator; wherein labeling a sentiment polarity includes labeling the sentiment polarity of the text as positive or negative; and constructing a characteristic indicator includes: constructing a plurality of sub characteristic indicators including a word itself, a rough graininess tag, a fine graininess tag, a short sentence where the word is located, a full long sentence where the word is located, and splicing the plurality of sub characteristic indicators to obtain the characteristic indicator.

Optionally, the sentiment classification corpus with the characteristic indicator is input into the metaphor identification model and converted into a vector through an embedding layer, and the vector passes through a transformer coding layer to obtain the metaphor information characteristic value of the text.

Optionally, a K-fold cross validation method is adopted, where the sentiment classification corpus is divided into K parts, one part is taken as a test set, and the remaining (K−1)

parts are taken as a training set and input into a transformer coding layer of a second pre-trained language model, to obtain the explicit characteristic value of the text.

Optionally, said combining the explicit characteristic value and the metaphor information characteristic value to obtain a comprehensive characteristic value, and inputting the comprehensive characteristic value to a feedforward neural network and a binary classification softmax layer to obtain a sentiment classification result includes: splicing the explicit characteristic value and the metaphor information characteristic value of the text in the test set to obtain the comprehensive characteristic value; and inputting the comprehensive characteristic value into the feedforward neural network and the binary classification softmax layer to obtain the sentiment classification result.

Optionally, the sentiment classification result is compared with the labelled sentiment polarity, and the BP algorithm is adopted to iteratively train the second pre-trained language model based on the training set; during the training, an accuracy is calculated by performing a following test on the trained second pre-trained language model with the test set; and when the accuracy is no longer improved, parameters of the second pre-trained language model are saved to obtain a trained explicit sentiment classification model.

Optionally, K explicit sentiment classification models are obtained after K times of training are completed by the K-fold cross validation method; an explicit sentiment classification model with a highest accuracy is determined from the K explicit sentiment classification models as a target explicit sentiment classification model; and the target explicit sentiment classification model and the metaphor identification model constitute the optimal sentiment classification model.

Embodiments of the present disclosure may provide following advantages.

In embodiments of the present disclosure, based on research on implicit sentient, implicit sentiment expressions in texts are taken into account, and both explicit and implicit sentiment expressions are comprehensively considered. Therefore, the sentiment classification model has a high accuracy, a wide application coverage and strong credibility.

In embodiments of the present disclosure, achievement of research on implicit sentiment may help to improve effect of text sentiment classification more comprehensively and accurately, positively promote research on various aspects such as text representation learning, natural language understanding, user modeling and knowledge embedding, and accelerate rapid development of applications and industries in fields based on text sentiment classification.

DETAILED DESCRIPTION

In order to clarify the object, solutions and advantages of embodiments of the present disclosure, embodiments of present disclosure will be described explicitly in detail in conjunction with accompanying drawings. Obviously, the described embodiments are some, but not all, embodiments of the present disclosure. Based on the embodiments of the present disclosure, all other embodiments obtained by those skilled in the art without creative work fall within the scope of the present disclosure.

Solutions of the present disclosure are described in detail with accompanying drawings below.

Figure 1:
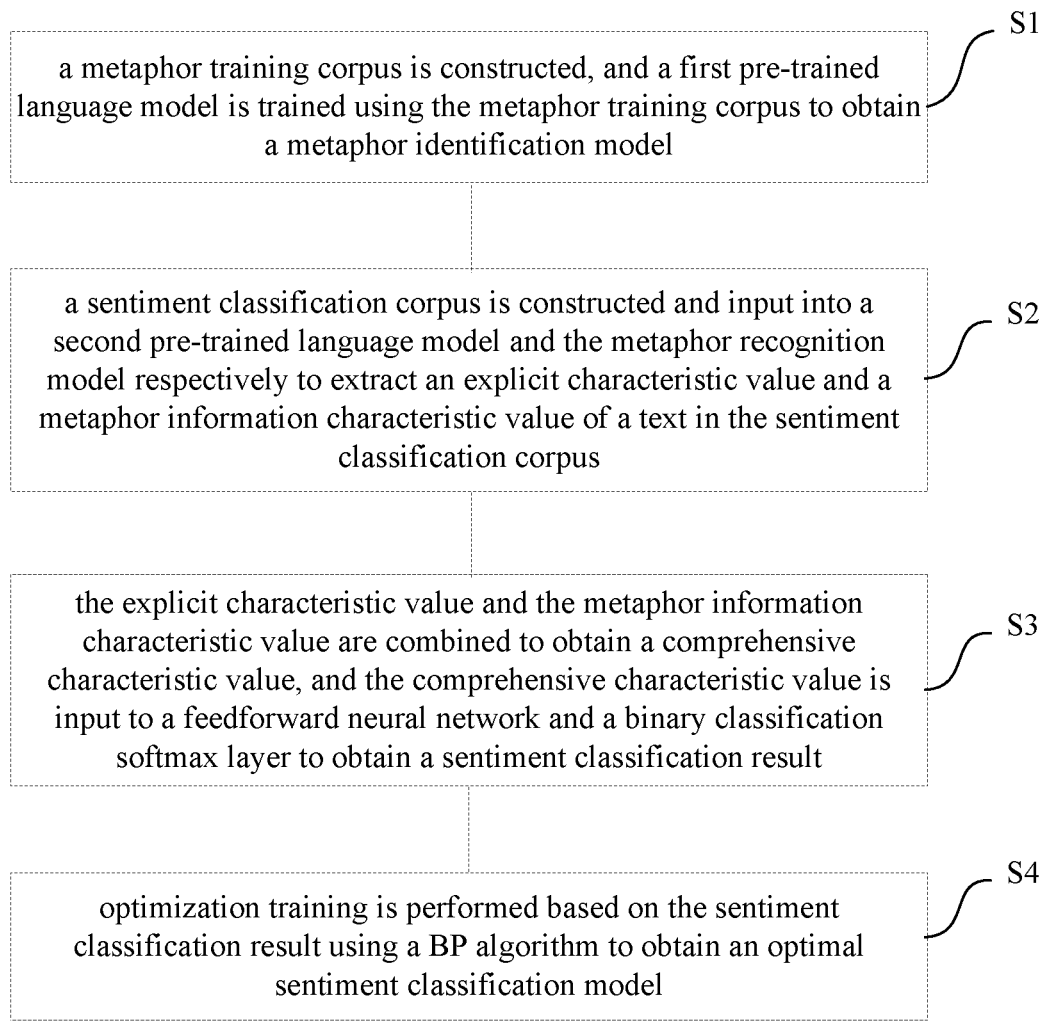
FIG. 1 schematically illustrates a flow chart of a method for constructing a sentiment classification model based on metaphor identification according to an embodiment.

FIG. 1 schematically illustrates a flow chart of a method for constructing a sentiment classification model based on metaphor identification according to an embodiment. The method includes S1, S2, S3 and S4.

In S1, a metaphor training corpus is constructed, and a first pre-trained language model is trained using the metaphor training corpus to obtain a metaphor identification model.

In some embodiments, constructing the metaphor training corpus includes:

obtaining text information by taking the Internet, corpus, and book data documents as main sources and focusing on novels, proses, essays, myths, fables, dramas, online blogs, Weibo comments, lyrics and other emotionally-charged text types, and performing screening and pre-processing on the text information, where, for example, about 30,000 texts are collected initially, and about 6,000 texts are remained after screening and preprocessing;

labeling each word in the text with a metaphor tag through a standardized Metaphor Identification Procedure (MIP), where for example, if having a metaphor, the metaphor tag is 1, or if not having a metaphor, the metaphor tag is 0; and constructing five sub characteristic indicators for each word including the word itself, a rough graininess tag, a fine graininess tag, a short sentence where the word is located, a full long sentence where the word is located, and splicing the five sub characteristic indicators with a symbol [SEP] therebetween to obtain a characteristic indicator.

Texts labeled with the metaphor tag and constructed with the characteristic indicator constitute the metaphor training corpus.

In some embodiments, training a first pre-trained language model using the metaphor training corpus to obtain a metaphor recognition model includes: applying a K-fold cross validation method based on the metaphor training corpus and the first pre-trained language model to obtain the metaphor recognition model, where the metaphor training corpus is divided into K parts (for example, 6,000 texts are divided into 10 parts), one of the K parts is taken as a test set, the remaining (K−1) parts are taken as the training set, the first pre-trained language model is trained and cross-validated for K times, and the model obtained with a best training effect is used as the metaphor recognition model.

The training and cross-validation of the first pre-trained language model each time includes: inputting the training set into the first pre-trained language model, the text with the characteristic indicator in the training set being converted into a vector through an embedding layer, and the vector sequentially passing through 12 transformer coding layers, the feedforward neural network and the binary classification softmax layer to output a metaphor classification result, i.e., a tag of 0 or 1; comparing the labelled metaphor tag with the metaphor classification result, and adopting the BP algorithm to iteratively train the first pre-trained language model based on the training set, where each iteration uses a mini-batch method to calculate a network error and update a weight; during the training, calculating an accuracy by performing a following test on the trained first pre-trained language model with the test set; and when the accuracy is no longer improved, saving parameters of the first pre-trained language model to obtain the trained first pre-trained language model at this time.

A first pre-trained language model with a highest accuracy (with a best effect) is determined from the K trained first pre-trained language models as the metaphor identification model.

In some embodiments, the first pre-trained language model is a Chinese BERT pre-trained model (chinese-roberta-wwm-ext) released by Joint Laboratory of HIT and iFLYTEK Research.

In S2, a sentiment classification corpus is constructed and input into a second pre-trained language model and the metaphor recognition model respectively to extract an explicit characteristic value and a metaphor information characteristic value of a text in the sentiment classification corpus.

In some embodiments, constructing the sentiment classification corpus includes:
  obtaining corpus texts, for example, collecting comments from public web pages such as Dianping and Douban, and after filtering (deleting texts with no clear polarity, such as emojis and forwarding), labeling the remaining texts with 1 or 0 according to sentiment polarity, where 1 represents positive, and 0 represents negative, and for example, 20,000 comments are collected, and 13,000 comments are remained after filtering;
  constructing a characteristic indicator, which includes constructing a plurality of sub characteristic indicators including a word itself, a rough graininess tag, a fine graininess tag, a short sentence where the word is located, a full long sentence where the word is located, and splicing the plurality of sub characteristic indicators to obtain the characteristic indicator; and
  texts labeled with the sentiment polarity and constructed with the characteristic indicator constituting the metaphor training corpus.

In some embodiments, inputting the sentiment classification corpus into a second pre-trained language model and the metaphor recognition model respectively to extract an explicit characteristic value and a metaphor information characteristic value of a text in the sentiment classification corpus includes:
  inputting the sentiment classification corpus with the characteristic indicator into the metaphor recognition model and converting it into a vector through an embedding layer, and the vector passing through 12 transformer coding layers to obtain the metaphor information characteristic value of the text.

A K-fold cross validation method is adopted, where the sentiment classification corpus is divided into K parts, one part is taken as a test set, and the remaining (K−1) parts are taken as a training set and input into a transformer coding layer of the second pre-trained language model, to obtain the explicit characteristic value of the text.

In some embodiments, the second pre-trained language model is also the Chinese BERT pre-trained model (chinese-roberta-wwm-ext) released by Joint Laboratory of HIT and iFLYTEK Research.

In S3, the explicit characteristic value and the metaphor information characteristic value are combined to obtain a comprehensive characteristic value, and the comprehensive characteristic value is input to a feedforward neural network and a binary classification softmax layer to obtain a sentiment classification result.

In some embodiments, the explicit characteristic value and the metaphor information characteristic value of the text in the test set are spliced to obtain the comprehensive characteristic value; and the comprehensive characteristic value is input into the feedforward neural network and the binary classification softmax layer to obtain the sentiment classification result, i.e., a tag of 0 or 1, where 1 represents positive, and 0 represents negative.

In S4, optimization training is performed based on the sentiment classification result using a BP algorithm to obtain an optimal sentiment classification model.

In some embodiments, the sentiment classification result is compared with the labelled sentiment polarity, and the BP algorithm is adopted to iteratively train the second pre-trained language model based on the training set; during the training, an accuracy is calculated by performing a following test on the trained second pre-trained language model with the test set; and when the accuracy is no longer improved, parameters of the second pre-trained language model are saved to obtain a trained explicit sentiment classification model.

In some embodiments, K explicit sentiment classification models are obtained after K times of training are completed by the K-fold cross validation method; an explicit sentiment classification model with a highest accuracy is determined from the K explicit sentiment classification models as a target explicit sentiment classification model; and the target explicit sentiment classification model and the metaphor recognition model constitute the optimal sentiment classification model.

Figure 2:
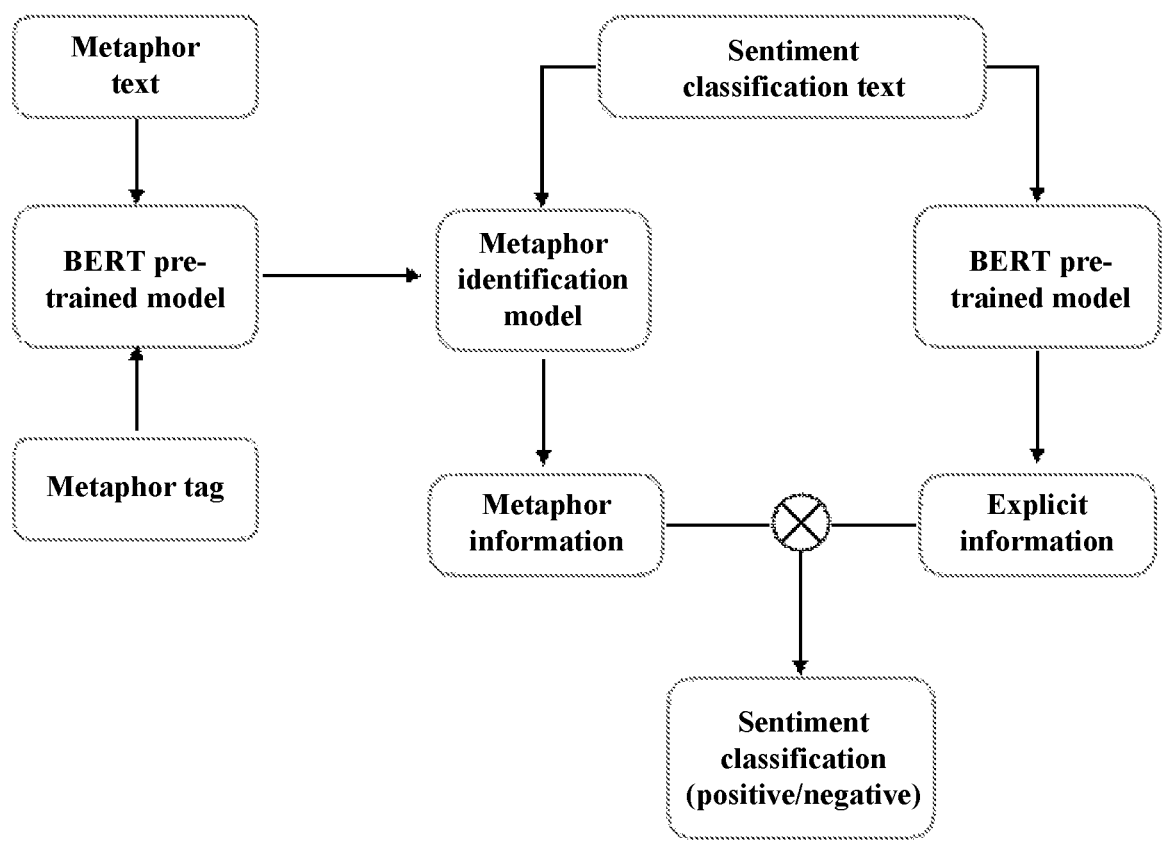
FIG. 2 schematically illustrates a flow chart of classification by a sentiment classification model based on metaphor identification according to an embodiment.

Referring to FIG. 2, in some embodiments, performing sentiment classification on a new text using the sentiment classification model includes:
  constructing a characteristic indicator for the new text;
  the new text constructed with the characteristic indicator passing through 12 transformer coding layers in an English identification model to output a metaphor information characteristic value;
  the new text passing through 12 transformer coding layers in an explicit sentiment classification model to output an explicit information characteristic value;
  splicing the explicit characteristic value and the metaphor information characteristic value to obtain a comprehensive characteristic value; and inputting the comprehensive characteristic value into the feedforward neural network and the binary classification softmax layer to obtain a classification result, where 0 represents negative, and 1 represents positive.

Embodiments of the present disclosure may provide following advantages.

In embodiments of the present disclosure, based on research on implicit sentient, implicit sentiment expressions in texts are taken into account, and both explicit and implicit sentiment expressions are comprehensively considered. Therefore, the sentiment classification model has a high accuracy, a wide application coverage and strong credibility.

In embodiments of the present disclosure, achievement of research on implicit sentiment may help to improve effect of text sentiment classification more comprehensively and accurately, positively promote research on various aspects such as text representation learning, natural language understanding, user modeling and knowledge embedding, and accelerate rapid development of applications and industries in fields based on text sentiment classification.

Although the present disclosure has been disclosed above with reference to preferred embodiments thereof, it should be understood that the disclosure is presented by way of example merely, and not limitation. Those skilled in the art can modify and vary the embodiments without departing from the spirit and scope of the present disclosure.

What is claimed is:

1. A method for constructing a sentiment classification model based on metaphor identification, comprising:
   constructing a metaphor training corpus, and training a first pre-trained language model using the metaphor training corpus to obtain a metaphor identification model;
   constructing a sentiment classification corpus, and inputting the sentiment classification corpus into a second pre-trained language model and the metaphor identification model respectively to extract an explicit characteristic value and a metaphor information characteristic value of a text in the sentiment classification corpus;
   combining the explicit characteristic value and the metaphor information characteristic value to obtain a comprehensive characteristic value, and inputting the comprehensive characteristic value to a feedforward neural network and a binary classification softmax layer to obtain a sentiment classification result; and
   performing optimization training based on the sentiment classification result using a BP algorithm to obtain an optimal sentiment classification model, wherein the optimal sentiment classification model is used for sentiment classification of text data.

2. The method according to claim 1, wherein said constructing a metaphor training corpus comprises labeling a metaphor tag and constructing a characteristic indicator;
   wherein labeling a metaphor tag comprises labeling each word in the text with a tag of having or not having a metaphor through a standardized metaphor identification procedure; and
   constructing a characteristic indicator comprises: constructing a plurality of sub characteristic indicators comprising the word itself, a rough graininess tag, a fine graininess tag, a short sentence where the word is located, a full long sentence where the word is located, and splicing the plurality of sub characteristic indicators to obtain the characteristic indicator.

3. The method according to claim 2, wherein said training a first pre-trained language model using the metaphor training corpus to obtain a metaphor identification model comprises:
   applying a K-fold cross validation method based on the metaphor training corpus and the first pre-trained language model to obtain the metaphor identification model, where the metaphor training corpus is divided into K parts, one of the K parts is taken as a test set, the remaining (K−1) parts are taken as the training set, the first pre-trained language model is trained and cross-validated for K times, and the model obtained with a best training effect is used as the metaphor identification model.

4. The method according to claim 3, wherein the training and cross-validated of the first pre-trained language model each time comprises:
   inputting the training set into the first pre-trained language model, the text with the characteristic indicator in the training set being converted into a vector through an embedding layer, and the vector sequentially passing through a transformer coding layer, the feedforward neural network and the binary classification softmax layer, to output a metaphor classification result;
   comparing the labelled metaphor tag with the metaphor classification result, and adopting the BP algorithm to iteratively train the first pre-trained language model based on the training set;
   during the training, calculating an accuracy by performing a following test on the trained first pre-trained language model with the test set; and
   when the accuracy is no longer improved, saving parameters of the first pre-trained language model to obtain the trained first pre-trained language model at this time.

5. The method according to claim 1, wherein said constructing a sentiment classification corpus comprises labeling a sentiment polarity and constructing a characteristic indicator;
   wherein labeling a sentiment polarity comprises labeling the sentiment polarity of the text as positive or negative; and
   constructing a characteristic indicator comprises: constructing a plurality of sub characteristic indicators comprising a word itself, a rough graininess tag, a fine graininess tag, a short sentence where the word is located, a full long sentence where the word is located, and splicing the plurality of sub characteristic indicators to obtain the characteristic indicator.

6. The method according to claim 5, wherein the sentiment classification corpus with the characteristic indicator is input into the metaphor identification model and converted into a vector through an embedding layer, and the vector passes through a transformer coding layer to obtain the metaphor information characteristic value of the text.

7. The method according to claim 6, wherein a K-fold cross validation method is adopted, where the sentiment classification corpus is divided into K parts, one part is taken as a test set, and the remaining (K−1) parts are taken as a training set and input into a transformer coding layer of a second pre-trained language model, to obtain the explicit characteristic value of the text.

8. The method according to claim 7, wherein said combining the explicit characteristic value and the metaphor information characteristic value to obtain a comprehensive characteristic value, and inputting the comprehensive characteristic value to a feedforward neural network and a binary classification softmax layer to obtain a sentiment classification result comprises:
   splicing the explicit characteristic value and the metaphor information characteristic value of the text in the test set to obtain the comprehensive characteristic value; and
   inputting the comprehensive characteristic value into the feedforward neural network and the binary classification softmax layer to obtain the sentiment classification result.

9. The method according to claim 8, wherein the sentiment classification result is compared with the labelled sentiment polarity, and the BP algorithm is adopted to iteratively train the second pre-trained language model based on the training set;
   during the training, an accuracy is calculated by performing a following test on the trained second pre-trained language model with the test set; and
   when the accuracy is no longer improved, parameters of the second pre-trained language model are saved to obtain a trained explicit sentiment classification model.

10. The method according to claim 9, wherein K explicit sentiment classification models are obtained after K times of training are completed by the K-fold cross validation method;

an explicit sentiment classification model with a highest accuracy is determined from the K explicit sentiment classification models as a target explicit sentiment classification model; and the target explicit sentiment classification model and the metaphor identification model constitute the optimal sentiment classification model.

\* \* \* \* \*